(12) United States Patent
Yang

(10) Patent No.: US 12,471,567 B1
(45) Date of Patent: Nov. 18, 2025

(54) RADIALLY CONTRACTIBLE WEARABLE STRUCTURE

(71) Applicant: WINGSANGEL TECHNOLOGY TRADING (SHENZHEN) CO., Ltd., Shenzhen (CN)

(72) Inventor: Yukun Yang, Shenzhen (CN)

(73) Assignee: WINGSANGEL TECHNOLOGY TRADING (SHENZHEN) CO., Ltd., Shenzhen (CN)

( * ) Notice: Subject to any disclaimer, the term of this patent is extended or adjusted under 35 U.S.C. 154(b) by 0 days.

(21) Appl. No.: 19/291,669

(22) Filed: Aug. 6, 2025

(30) Foreign Application Priority Data

Aug. 7, 2024 (CN) .......................... 202421906645.7
Aug. 7, 2024 (CN) .......................... 202421908629.1

(51) Int. Cl.
   *A01K 15/02* (2006.01)
   *A01K 27/00* (2006.01)

(52) U.S. Cl.
   CPC .......... *A01K 15/022* (2013.01); *A01K 27/001* (2013.01); *A01K 27/009* (2013.01)

(58) Field of Classification Search
   CPC ... A01K 15/022; A01K 27/001; A01K 27/009
   See application file for complete search history.

(56) References Cited

U.S. PATENT DOCUMENTS

| | | | | |
|---|---|---|---|---|
| 6,606,967 B1 * | 8/2003 | Wolfe, Jr. | ............ | A01K 27/001 119/862 |
| 11,510,396 B1 * | 11/2022 | Price | ................... | A01K 27/005 |
| 2004/0011300 A1 * | 1/2004 | Herbst | ................. | A01K 27/001 119/769 |
| 2009/0235874 A1 * | 9/2009 | Sullivan | ............... | A01K 27/001 119/864 |
| 2012/0192811 A1 * | 8/2012 | Robinson | ............. | A01K 27/001 119/862 |
| 2014/0366814 A1 * | 12/2014 | Ritzdorf | ............... | A01K 27/001 119/856 |
| 2017/0000086 A1 * | 1/2017 | Fletcher | ............... | A01K 27/001 |
| 2021/0105977 A1 * | 4/2021 | Bethke | ................. | A01K 27/009 |
| 2021/0307292 A1 * | 10/2021 | Holt, Jr. | ................. | A01K 15/02 |
| 2022/0087226 A1 * | 3/2022 | Spater | .................... | A01K 15/04 |
| 2022/0312741 A1 * | 10/2022 | Hathaway | ............ | A01K 27/001 |

FOREIGN PATENT DOCUMENTS

EP            3542623 A1 * 9/2019 .......... A01K 27/005

* cited by examiner

*Primary Examiner* — Joshua D Huson
*Assistant Examiner* — Edgar Reyes
(74) *Attorney, Agent, or Firm* — Jose Cherson Weissbrot

(57) ABSTRACT

The present application proposes a radially contractible wearable structure including radial contraction modules, a traction rope, and a driving module; the radial contraction modules and the driving module are connected end to end to form a collar for a living organism to pass through; one side of each of the radial contraction modules close to the collar is configured to be connected to electric shock contacts; the radial contraction modules each have a contraction position that contracts in a direction close to a centerline of the collar and an expansion position that expands outward in a direction away from the centerline of the collar; a first end of the traction rope is connected to the radial contraction module, and a second end of the traction rope is connected to the driving module; and the driving module is configured to wind or release the traction rope.

9 Claims, 17 Drawing Sheets

RADIALLY CONTRACTIBLE WEARABLE STRUCTURE

TECHNICAL FIELD

The present application relates to the technical field of bark deterrents, and in particular to a radially contractible wearable structure.

BACKGROUND

As people's living standards improve, their concern for the quality of life of their pets is increasing, and more and more people see pets as part of their families. However, pet dogs sometimes cannot help but give in to their natural instincts, and their excessive barking often disrupts people's normal lives. As a result, people have invented a product designed to stop pet dogs from excessive barking, i.e., a bark deterrent. There are several types of bark deterrents. An electric-shock type bark deterrent works by applying a mild electric shock stimulus to a pet through contact with electric shock contacts and guiding the pet to alter its undesirable excessive barking behavior. The electric shock contacts need to remain in constant contact with the pet's skin to ensure the effect of electric shock.

SUMMARY

Embodiments of the present application provide a radially contractible wearable structure to solve the problems of the related art. The technical solution is described as follows.

An embodiment of the present application provides a radially contractible wearable structure, including radial contraction modules, a traction rope, and a driving module; where the radial contraction modules and the driving module are connected end to end to form a collar for a living organism to pass through, one side of each of the radial contraction modules close to the collar is configured to be connected to electric shock contacts, the radial contraction modules each have a contraction position that contracts in a direction close to a centerline of the collar to bring the electric shock contacts into contact with the living organism, and the radial contraction modules each also have an expansion position that expands outward in a direction away from the centerline of the collar to separate the electric shock contacts from the living organism;

a first end of the traction rope is connected to the radial contraction module, and a second end of the traction rope is connected to the driving module; and the driving module is configured to wind the traction rope to shorten a portion of the traction rope outside the driving module to drive the radial contraction module to switch from the expansion position to the contraction position, and the driving module is also configured to release the traction rope to extend the portion of the traction rope outside the driving module to drive the radial contraction module to switch from the contraction position to the expansion position.

BRIEF DESCRIPTION OF THE DRAWINGS

In accompanying drawings, the same reference signs denote the same or similar components or elements throughout multiple drawings unless otherwise specified. These drawings are not necessarily drawn to scale. It should be understood that these drawings depict only some embodiments according to the present application and should not be construed as limiting the scope of the present application.

LIST OF REFERENCE SIGNS

Figure 1:
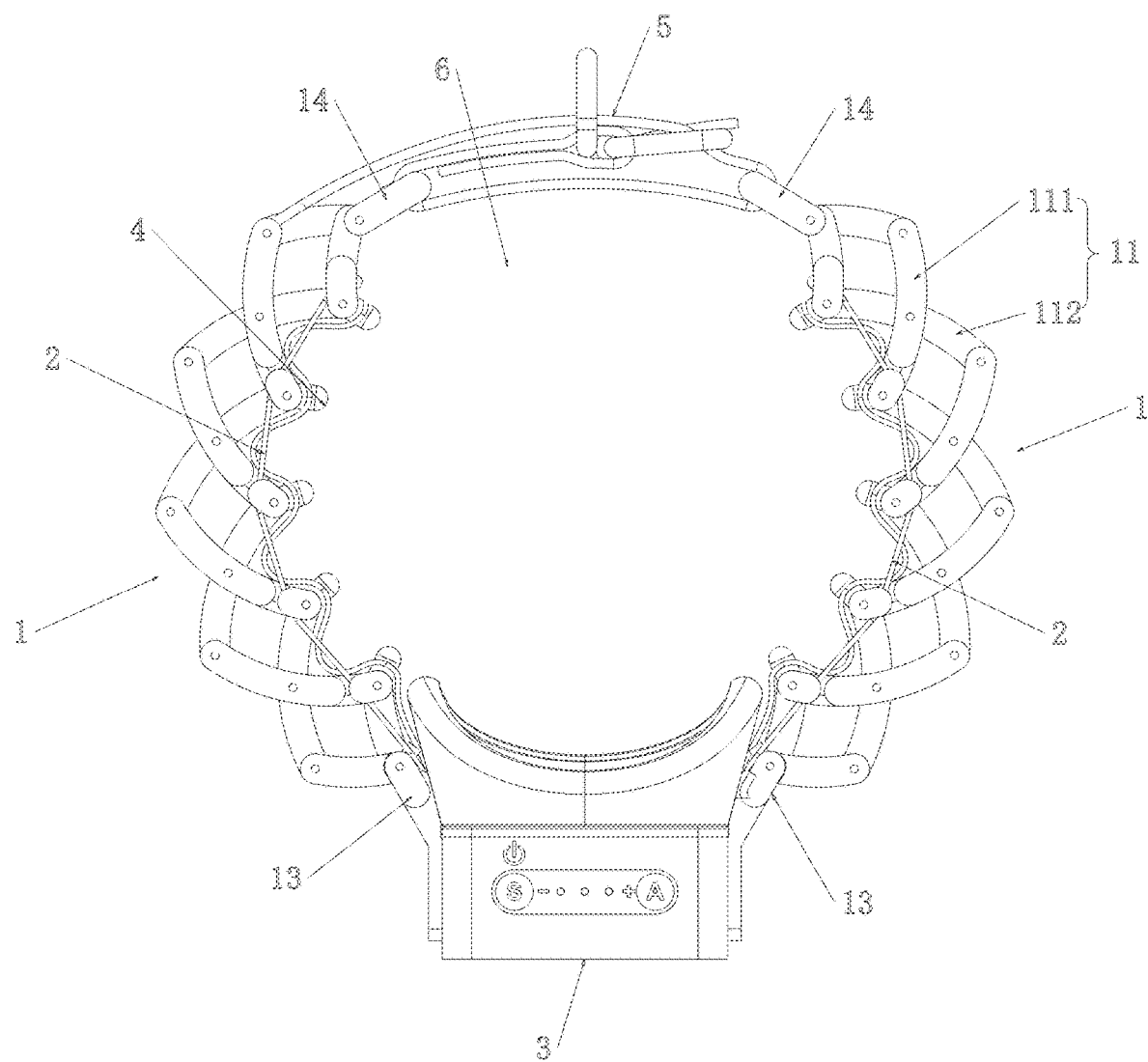
FIG. 1 is a structural schematic diagram of a top projection of a wearable structure according to an embodiment of the present application from a first perspective, with radial contraction modules in a contraction position.

1. Radial contraction module; 11. Scissor unit; 111. First rod; 112. Second rod; 113. First connecting shaft; 114.

Second connecting shaft; 12. Elastic return member; 13. Head connector; 14. Tail connector; 2. Traction rope; 3. Driving module; 31. Reel; 4. Electric shock contact; 5. Adjusting module; 51. Adjusting band; 52. Adjusting buckle; 6. Collar; 32. Electric motor; 321. Output shaft; 01. Mount; 011. Base; 0111. Acoustic inlet; 0112. Acoustic cavity; 0113. Acoustic outlet; 0114. First positioning groove; 0115. Second positioning groove; 012. Pressure ring; 0121. Connecting hole; 013. Washer; 014. Fastener; 0141. Limiting portion; 0142. Connecting portion; 02. Microphone; 03. Diaphragm; 04. Acoustic concentrator; 041. Sound-gathering channel; 05. Acoustic tube; 051. First horizontal segment; 052. Bent segment; 053. Second horizontal segment.

DETAILED DESCRIPTION OF EMBODIMENTS

Only some exemplary embodiments are briefly described below. As can be appreciated by those skilled in the art, modifications may be made to the described embodiments in various ways without departing from the spirit or scope of the present application. Therefore, the accompanying drawings and the description are considered as exemplary in nature rather than limiting.

Referring to FIGS. 1 to 13, a radially contractible wearable structure according to an embodiment of the present application is illustrated, including radial contraction modules 1, a traction rope 2, and a driving module 3.

The radial contraction modules 1 and the driving module 3 are connected end to end to form a collar 6, i.e., the wearable structure is a ring-shaped structure, the collar 6 allows a living organism to pass through so that the wearable structure can be worn on the living organism; one side of each of the radial contraction modules 1 close to the collar 6 is used to be connected to electric shock contacts 4; the radial contraction modules 1 each have a contraction position (see FIGS. 1 and 2 for details) that contracts in a direction close to a centerline of the collar 6 to bring the electric shock contacts 4 into contact with the living organism; and the radial contraction modules 1 each also have an expansion position (see FIGS. 4 and 5 for details) that expands outward in a direction away from the centerline of the collar 6 to separate the electric shock contacts 4 from the living organism.

A first end of the traction rope 2 is connected to the radial contraction module 1, and a second end of the traction rope 2 is connected to a driving module 3.

The driving module 3 is configured to wind the traction rope 2 to shorten a portion of the traction rope 2 outside the driving module 3 to drive the radial contraction module 1 to switch from the expansion position to the contraction position, and the driving module 3 is also configured to release the traction rope 2 to extend the portion of the traction rope 2 outside the driving module 3 to drive the radial contraction module 1 to switch from the contraction position to the expansion position.

The wearable structure of the present application includes the radial contraction modules 1, the traction rope 2, and the driving module 3. The radial contraction modules 1 and the driving module 3 are connected end to end to form a collar 6, the collar 6 allows a living organism to pass through, so that the wearable structure can be worn on the living organism. One side of each of the radial contraction modules 1 close to the collar 6 is provided with electric shock contacts 4. The radial contraction modules 1 each have a contraction position that contracts in a direction close to a centerline of the collar 6 to bring the electric shock contacts 4 into contact with the living organism. When the electric shock contacts 4 are powered on, a mild electric shock may be applied to the living organism through the electric shock contacts 4, prompting the living organism to alter its behavior through the electric shock, such as stopping unnecessary or excessive barking. The radial contraction modules 1 also each have an expansion position that expands outward in a direction away from the centerline of the collar 6 to separate the electric shock contacts 4 from the living organism, thereby maintaining a certain distance between the electric shock contacts 4 and the living organism when the application of the electric shock to the living organism is stopped, protecting the skin of the living organism and avoiding constriction injury to the skin of the living organism. The first end of the traction rope 2 is connected to the radial contraction module 1 and the second end of the traction rope 2 is connected to the driving module 3. The driving module 3 is able to wind the traction rope 2 to shorten the portion of the traction rope 2 outside the driving module 3 to drive the radial contraction module 1 to switch from the expansion position to the contraction position. That is, the radial contraction module 1 contracts by means of the traction rope 2, which ensures the contact between the electric shock contacts 4 and the living organism and enables the electric shock to the living organism. The driving module 3 is also able to release the traction rope 2 to extend the portion of the traction rope 2 outside the driving module 3 to drive the radial contraction module 1 to switch from the contraction position to the expansion position. That is, the radial contraction module 1 is released by means of the traction rope 2, and thus the radial contraction module 1 can be switched to the expansion position, thereby maintaining a certain distance between the electric shock contacts 4 and the living organism, enabling controlled contact between the electric shock contacts 4 and the skin of the living organism, and providing the wearable device with a controllable skin contact function while effectively avoiding constriction injury to the skin of the living organism. Moreover, the need for repeated manual removal of the wearable structure may be omitted, which simplifies the operation and improves the ease of use. In addition, the wearable structure of the present application can be used not only for pets, but also for other living organisms having necks or similar neck structures, such as humans, animals, and some plants, and can even be applied to industrial products having cylindrical structures. The present application does not strictly limit the application scenarios of the wearable structure.

Referring to FIGS. 1 to 5, in an embodiment, two radial contraction modules 1 are provided.

The radially contractible wearable structure further includes:

an adjusting module 5, where the adjusting module 5, one of the radial contraction modules 1, the driving module 3, and the other of the radial contraction modules 1 are connected end to end in sequence to form the collar 6, and the adjusting module 5 is configured to adjust the size of the collar 6. That is, the adjusting module 5, one of the radial contraction modules 1, the driving module 3, and the other radial contraction module 1 are connected end to end in sequence to form a ring-shaped wearable structure. The adjusting module 5 and the driving module 3 are spaced apart based on the two radial contraction modules 1, so that the two radial contraction modules 1 are supported stably, and accordingly the two radial contraction modules 1 can contract or expand stably, which improves the structural reliability. Moreover, since the adjusting module 5 can adjust the size of the collar 6, in the process of wearing the wearable structure, the diameter of the collar 6 can be increased by operating the adjusting module 5, so that the wearable structure can be worn on the neck, hand, leg, waist, etc., of the living organism. After that, the diameter of the collar 6 can be reduced by operating the adjusting module 5, so that the diameter of the collar 6 can match the dimension of the neck, hand, leg, waist, etc., of the living organism, thereby preventing the wearable structure from detaching from the living organism. When the wearable structure is to be removed, the diameter of the collar 6 can also be increased by operating the adjusting module 5 so that the wearable structure can be removed from the living organism conveniently. Therefore, it is more convenient to put on and take off the wearable structure.

It is to be understood that the wearable structure can achieve a controllable skin contact function. The purpose of skin contact is to apply an electric shock (or other purpose, such as a touch alert) to warn and correct the behavior of the living organism. However, this purpose does not exist at all times, so it is not necessary for the electric shock contacts 4 to be in constant contact with the skin. Furthermore, skin contact at a fixed position for a long time may cause constriction injury to the skin of the living organism, and such injury may sometimes be very severe. Therefore, the wearable structure with controllable skin contact may implement skin contact as needed while avoiding injury caused by excessive contact.

In other embodiments, the number of the radial contraction modules 1 may be one or three or more, which can be specifically adjusted according to the size of the neck, hand, leg, waist, and other body parts of the living organism.

In other embodiments, the wearable structure may be provided with no adjusting module 5, or may achieve the purpose of adjustment in other design forms.

Referring to FIGS. 1 to 5, in an embodiment, the radial contraction module 1 includes a plurality of scissor units 11, each of the scissor units 11 is provided with a first rod 111 and a second rod 112, the first rod 111 and the second rod 112 are articulated, the first rod 111 and the second rod 112 are capable of crossing each other, and the plurality of scissor units 11 are articulated end to end in sequence around the centerline of the collar 6.

Among the plurality of scissor units 11, the scissor unit 11 at a head end is articulated to a head end of the adjusting module 5, and the scissor unit 11 at a tail end is articulated to the driving module 3.

Figure 2:
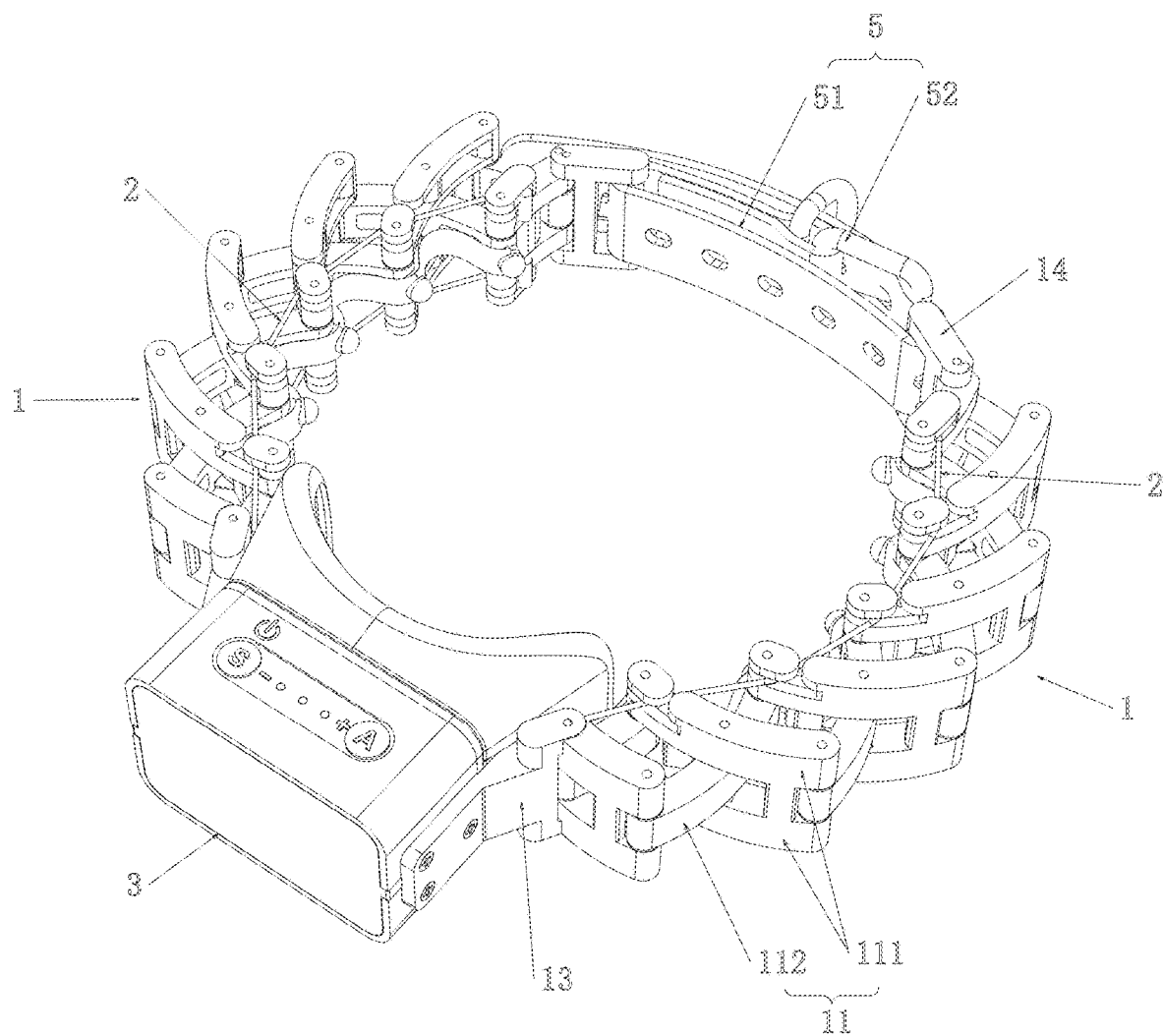
FIG. 2 is a structural perspective schematic diagram of a wearable structure according to an embodiment of the present application from a second perspective, with radial contraction modules in a contraction position.
Figure 3:
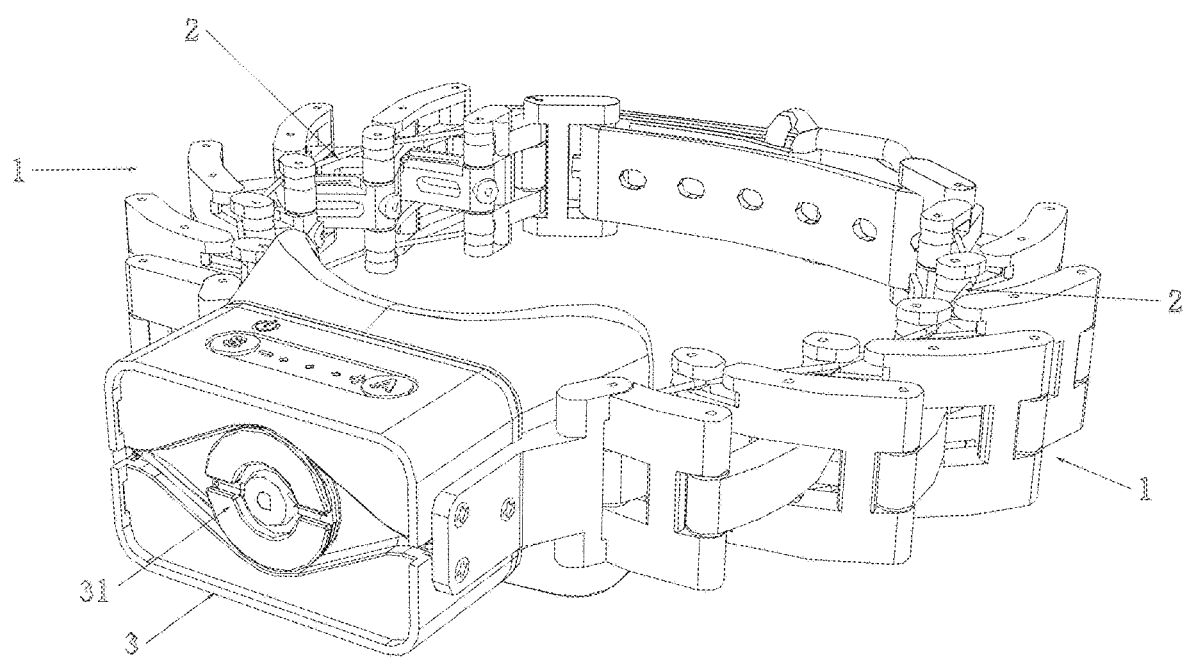
FIG. 3 is a structural perspective schematic diagram of a wearable structure according to an embodiment of the present application from a second perspective, with radial contraction modules in a contraction position.
Figure 4:
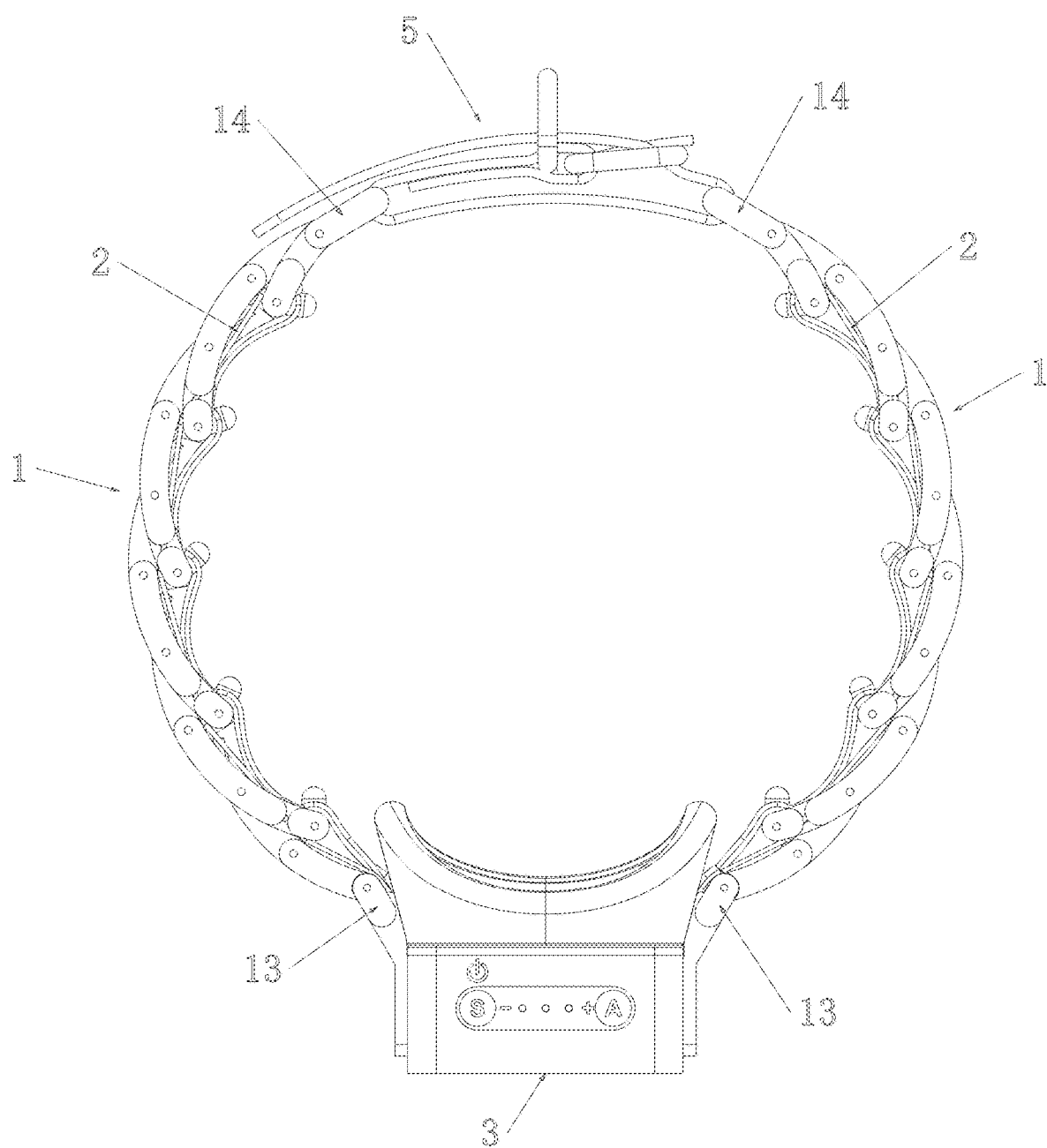
FIG. 4 is a structural schematic diagram of a top projection of a wearable structure according to an embodiment of the present application from a first perspective, with radial contraction modules in an expansion position.
Figure 5:
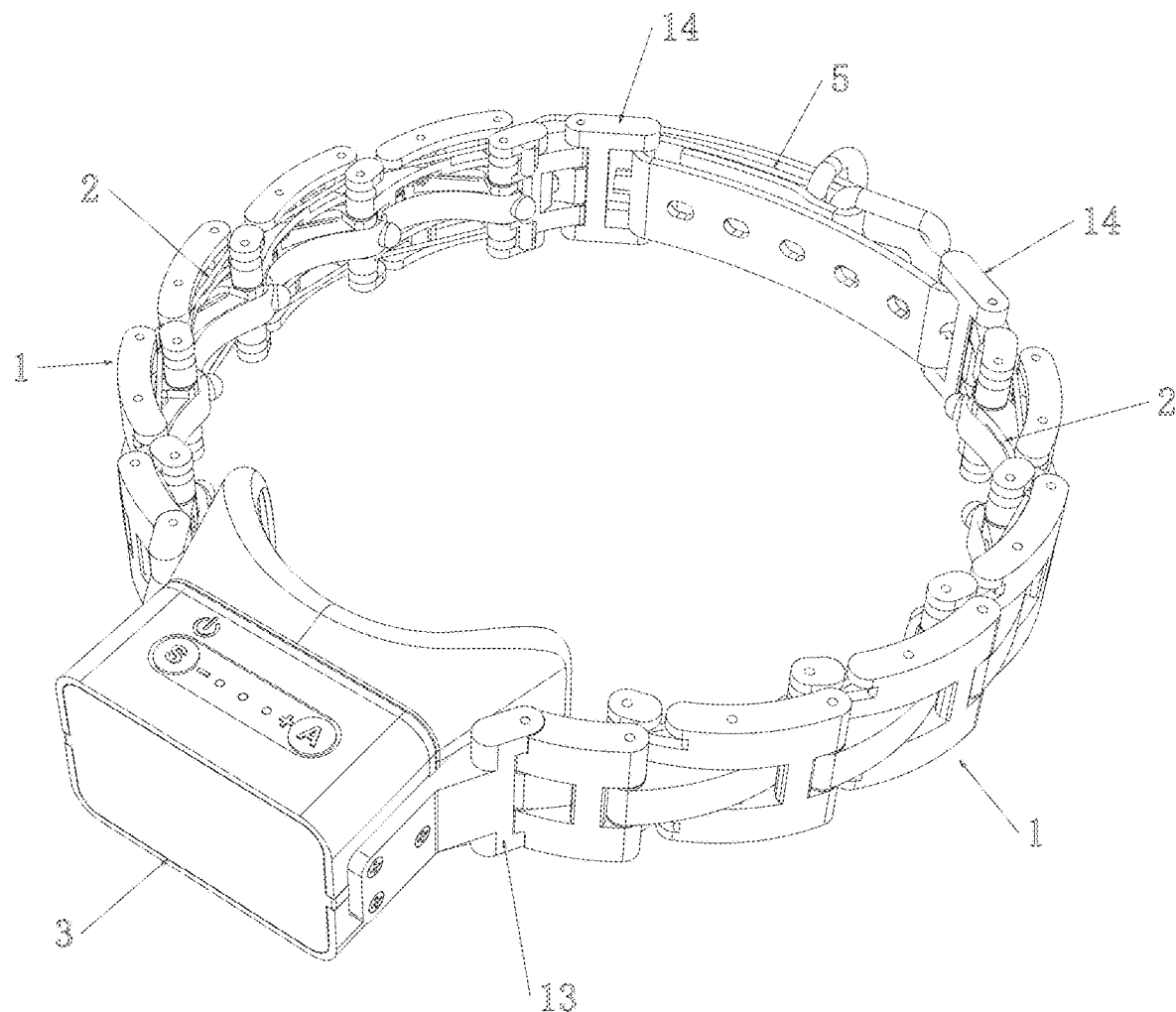
FIG. 5 is a structural perspective schematic diagram of a wearable structure according to an embodiment of the present application from a second perspective, with radial contraction modules in an expansion position.
Figure 6:
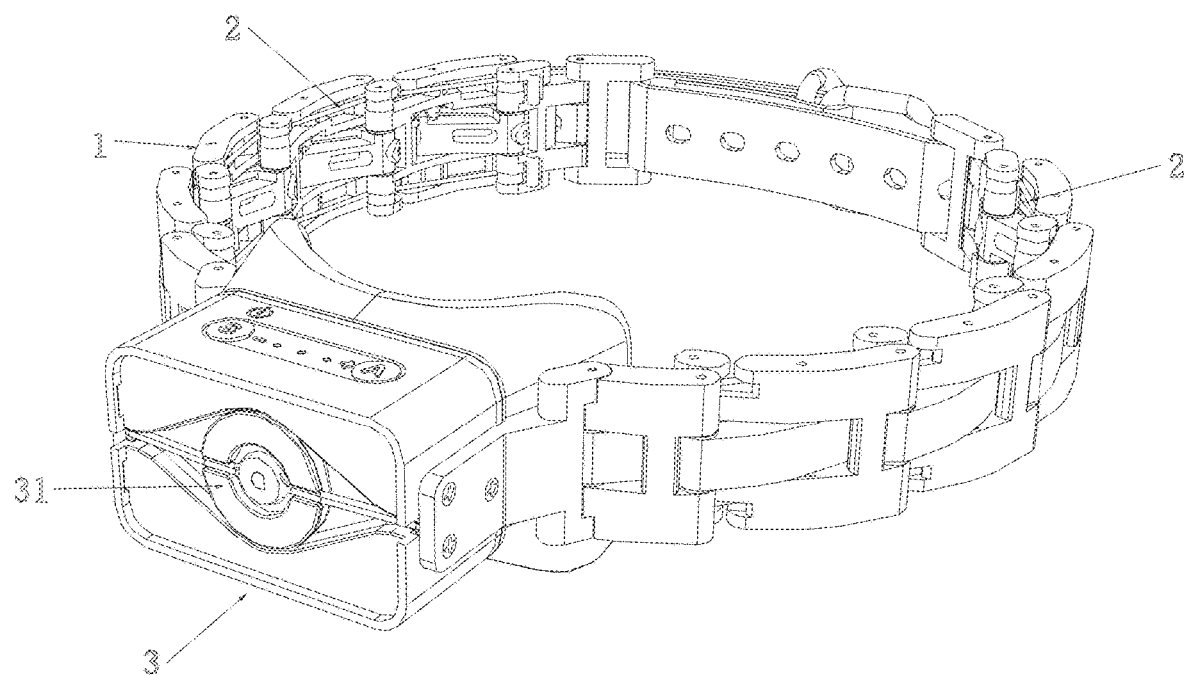
FIG. 6 is a structural perspective schematic diagram of a wearable structure according to an embodiment of the present application from a second perspective.
Figure 7:
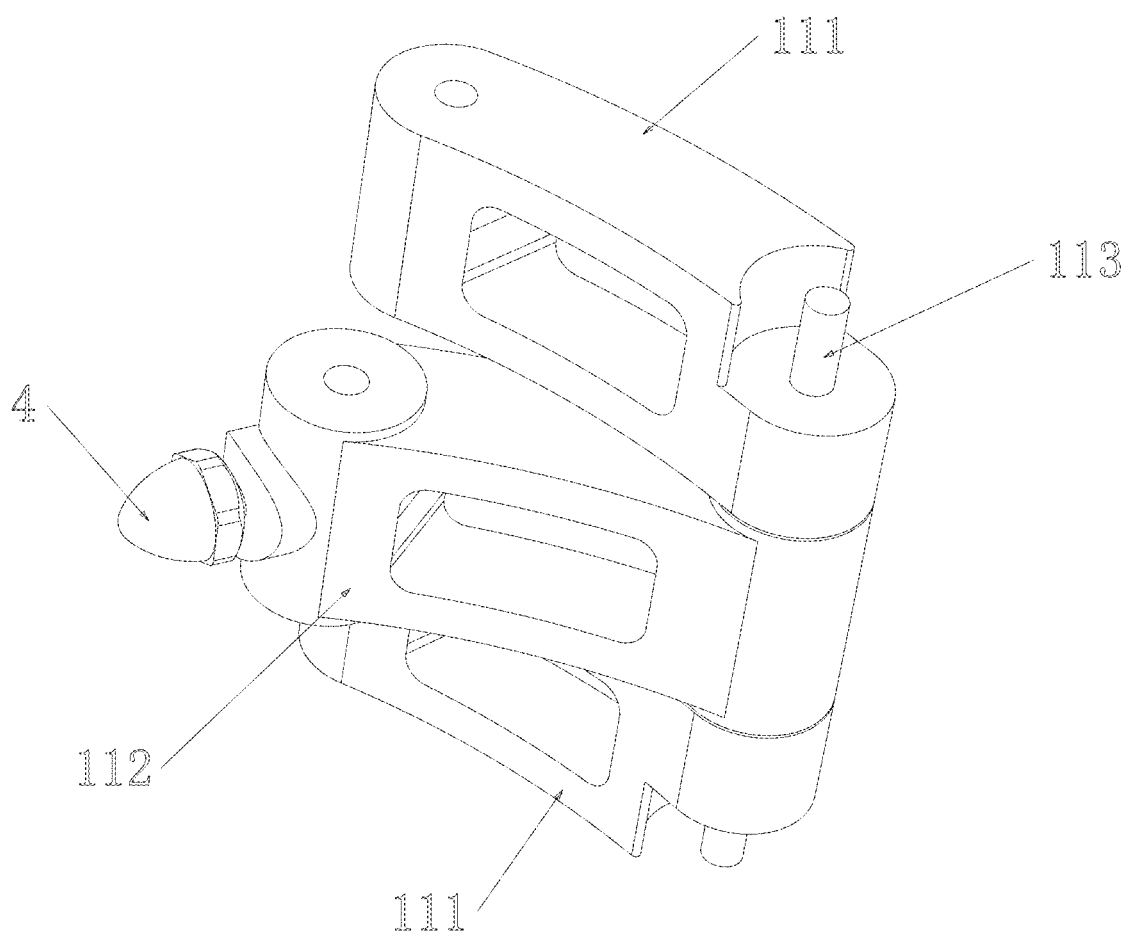
FIG. 7 is a structural perspective schematic diagram of a short scissor unit according to an embodiment of the present application.

Each of the electric shock contacts 4 is disposed on the first rod 111 and/or the second rod 112. Referring to FIGS. 1 and 2, by winding the traction rope 2 through the driving module 3, the first rod 111 and second rod 112 in each scissor unit 11 can be moved to a crossed state, causing the electric shock contact 4 to move along with the first rod 111 and/or the second rod 112 to be positioned on the side closer to the centerline of the collar 6, ensuring that the electric shock contact 4 can come into contact with the skin of the living organism to apply an electric shock to the living organism. Referring to FIGS. 4 and 5, by releasing the traction rope 2 through the driving module 3, each of the scissor units 11 is released, allowing the first rod 111 and the second rod 112 to move to a superposed state such that the electric shock contact 4 moves along with the first rod 111 and/or the second rod 112 to be positioned on the side farther from the centerline of the collar 6, ensuring that the electric shock contact 4 is separated from the skin of the living organism by a certain distance. The radial contraction module 1 composed of the plurality of scissor units 11 has high structural stability.

In other embodiments, the specific structure of the radial contraction module 1 may also be: one or more rotating shaft systems, through which the electric shock contact 4 can be controlled to come into contact with the skin in a controllable manner, such as a rotating shaft system of a conventional flip phone.

In other embodiments, the specific structure of the radial contraction module 1 may also be: a robot structure similar to a human finger.

In order to further improve the structural reliability of the radial contraction module 1, reference is made to FIGS. 7 to 11, in an embodiment, two first rods 111 and one second rod 112 are included in the same scissor unit 11, and one of the first rods 111, the second rod 112 and the other first rod 111 are arranged in sequence in a height direction of the scissor unit 11. In two adjacent scissor units 11, a tail end of the second rod 112 of a previous scissor unit 11 is disposed between head ends of the two first rods 111 in a latter scissor unit 11, and the tail end of the second rod 112 of the previous scissor unit 11 is articulated to the head ends of the two first rods 111 of the latter scissor unit 11. The height direction of the scissor unit 11 is the same as the direction of the centerline of the collar 6.

In two adjacent scissor units 11, a head end of the second rod 112 of the latter scissor unit 11 is disposed between tail ends of the two first rods 111 of the previous scissor unit 11, and the head end of the second rod 112 of the latter scissor unit 11 is articulated to the tail ends of the two first rods 111 of the previous scissor unit 11. By arranging one of the first rods 111, the second rod 112, and the other first rod 111 in sequence in the height direction of the scissor unit 11, a radial dimension of the scissor unit 11 at the expansion position may be made smaller during expansion, thereby minimizing the space occupation and bringing convenience to wear the wearable structure.

In an embodiment, among the plurality of scissor units 11 of the same radial contraction module 1, the two scissor units 11 at the head and tail ends each have a length that is smaller than a length of any of the remaining scissor units 11, making the contraction and expansion movements of the radial contraction module 1 smoother.

In an embodiment, the number of the remaining scissor units 11 between the two scissor units 11 at the head and tail ends among the plurality of scissor units 11 of the same radial contraction module 1 may be one, or two, or three or more, which can be adjusted based on the size of the neck, hand, and other parts of the living organism.

In an embodiment, the first rod 111 and the second rod 112 each have an arc-shaped structure arranged around the centerline of the collar 6, so that when the radial contraction module 1 is in the expansion position, the wearable structure may form an approximately ring-shaped structure, and the overall structure is more compact and is easier to wear.

In other embodiments, the first rod 111 and the second rod 112 may each have a straight rod structure.

In an embodiment, among the plurality of scissor units 11, each of the long scissor units 11 is further provided with an elastic return member 12, the elastic return member 12 is configured to provide a driving force to the first rod 111 and the second rod 112 to drive the radial contraction module 1 to switch from the contraction position to the expansion position when the portion of the traction rope 2 outside the driving module 3 is extended. Thus, during contraction, a tightening force can be applied to the radial contraction module 1 via the traction rope 2 to overcome the driving force, thereby driving the radial contraction module 1 to switch to the contraction position. During expansion, the radial contraction module 1 is released by means of the traction rope 2 while the elastic return member 12 returns to its original position to apply a driving force to the first rod 111 and the second rod 112 until the radial contraction module 1 returns to the expansion position. Manual resetting of the radial contraction module 1 is not required, making the operation more effortless and further enhancing the ease of use.

Referring to FIGS. 7 to 11, in an embodiment, in the same scissor unit 11, one of the first rods 111, the second rod 112 and the other first rod 111 are articulated together by a first connecting shaft 113 threading the three.

In two adjacent scissor units 11, a tail end of the second rod 112 of a previous scissor unit 11 is articulated to head ends of the two first rods 111 in a latter scissor unit 11 through a second connecting shaft 114.

In two adjacent scissor units 11, a head end of the second rod 112 in the latter scissor unit 11 is articulated to tail ends of the two first rods 111 in the previous scissor unit 11 through a second connecting shaft 114.

Figure 8:
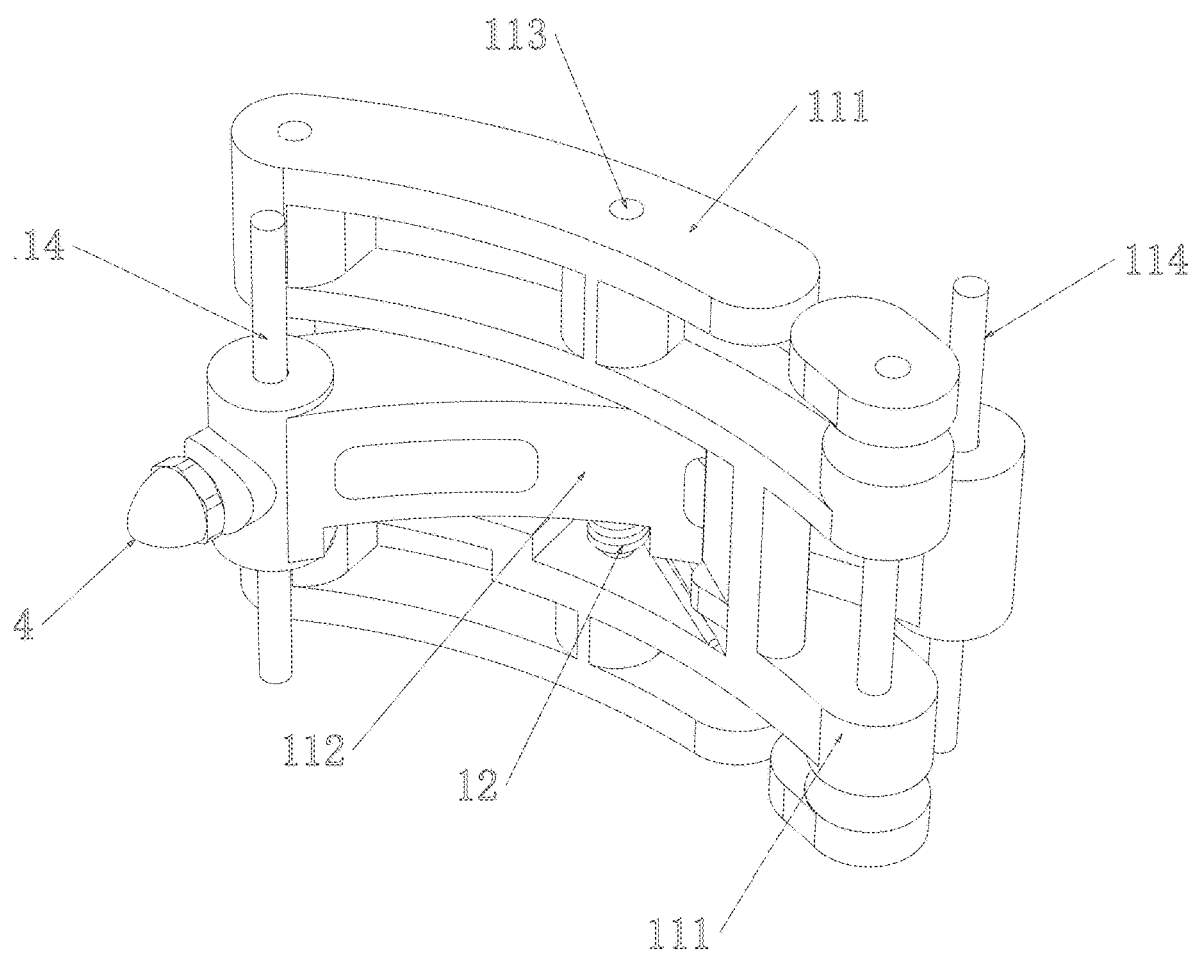
FIG. 8 is a structural perspective schematic diagram of a long scissor unit according to an embodiment of the present application.
Figure 9:
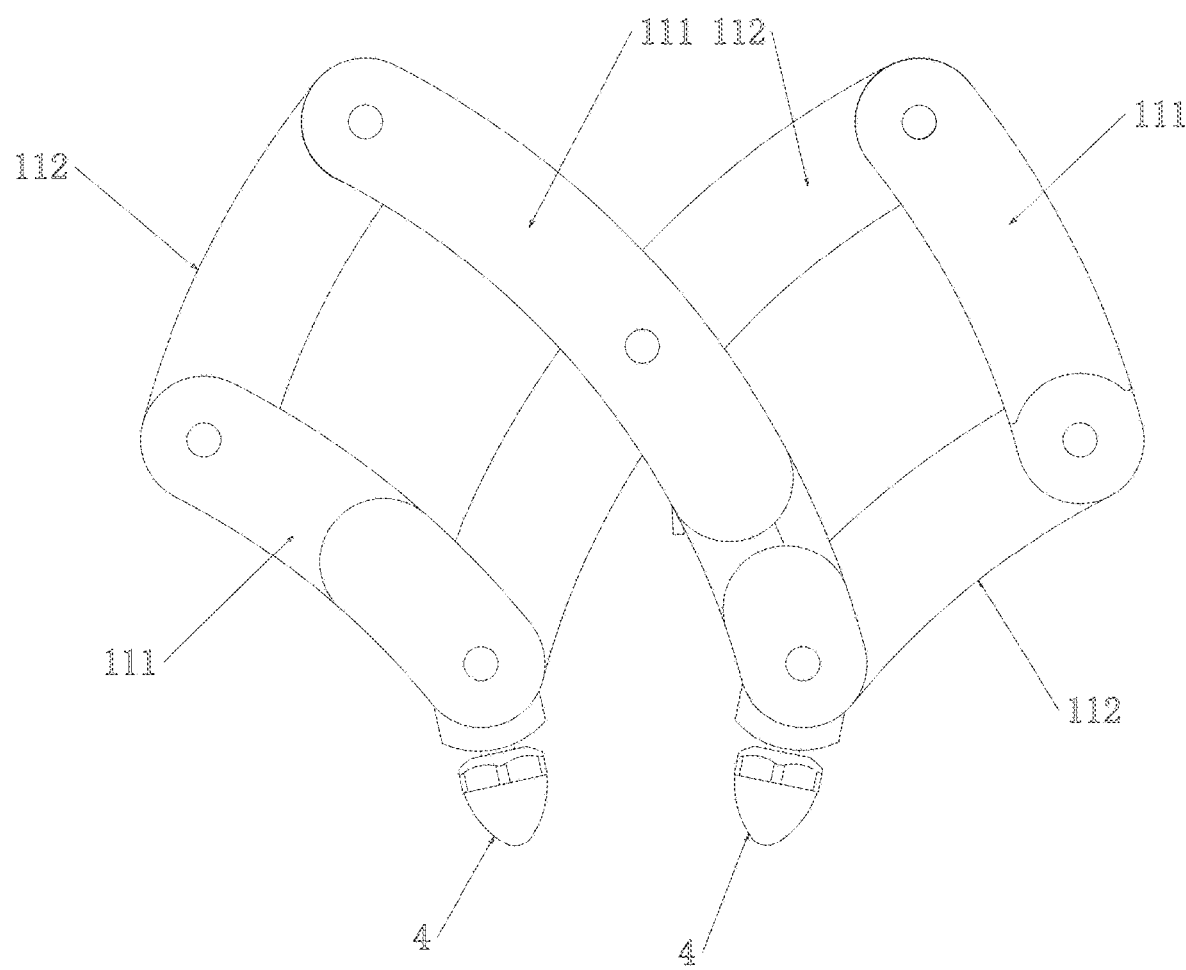
FIG. 9 is a structural perspective schematic diagram of a short scissor unit and a long scissor unit being connected together according to an embodiment of the present application.
Figure 10:
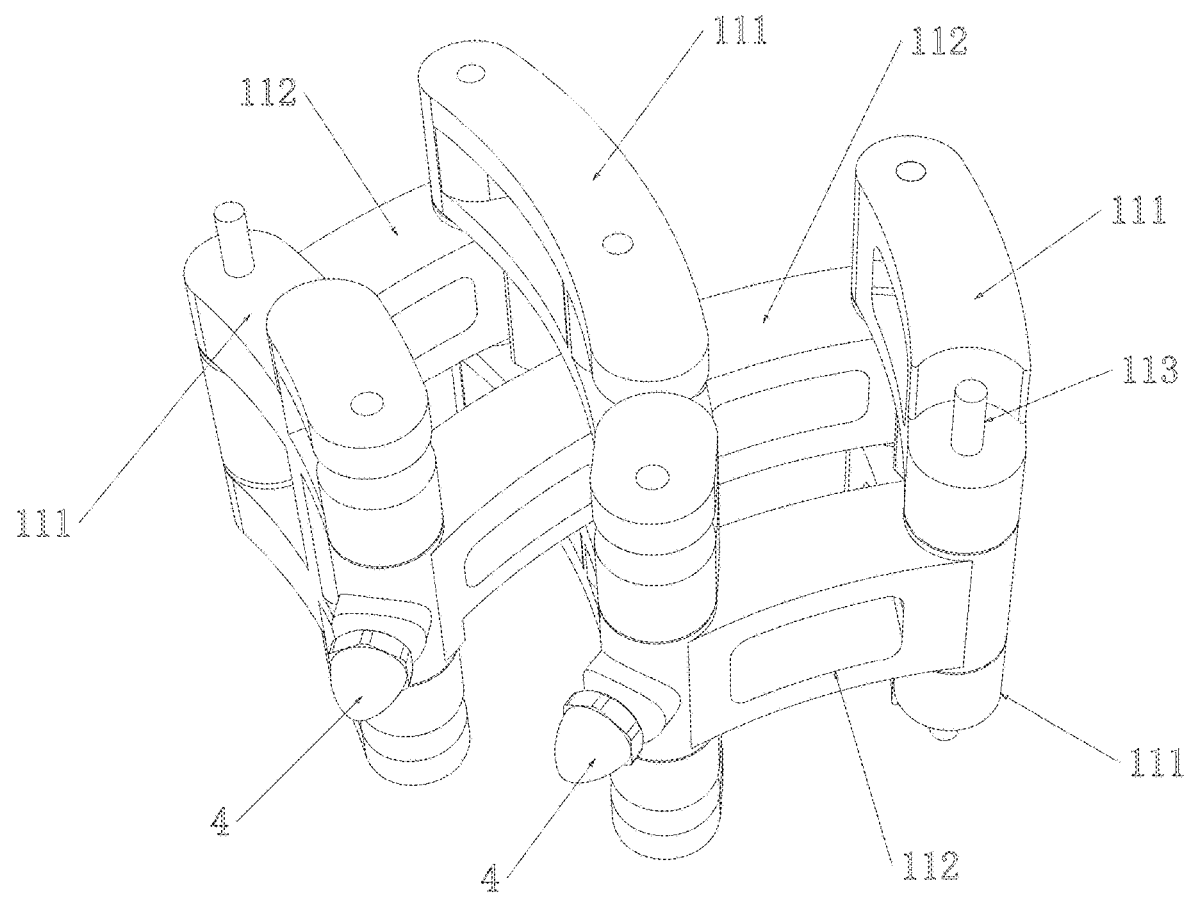
FIG. 10 is a structural perspective schematic diagram of a short scissor unit and a long scissor unit being connected together according to an embodiment of the present application.
Figure 11:
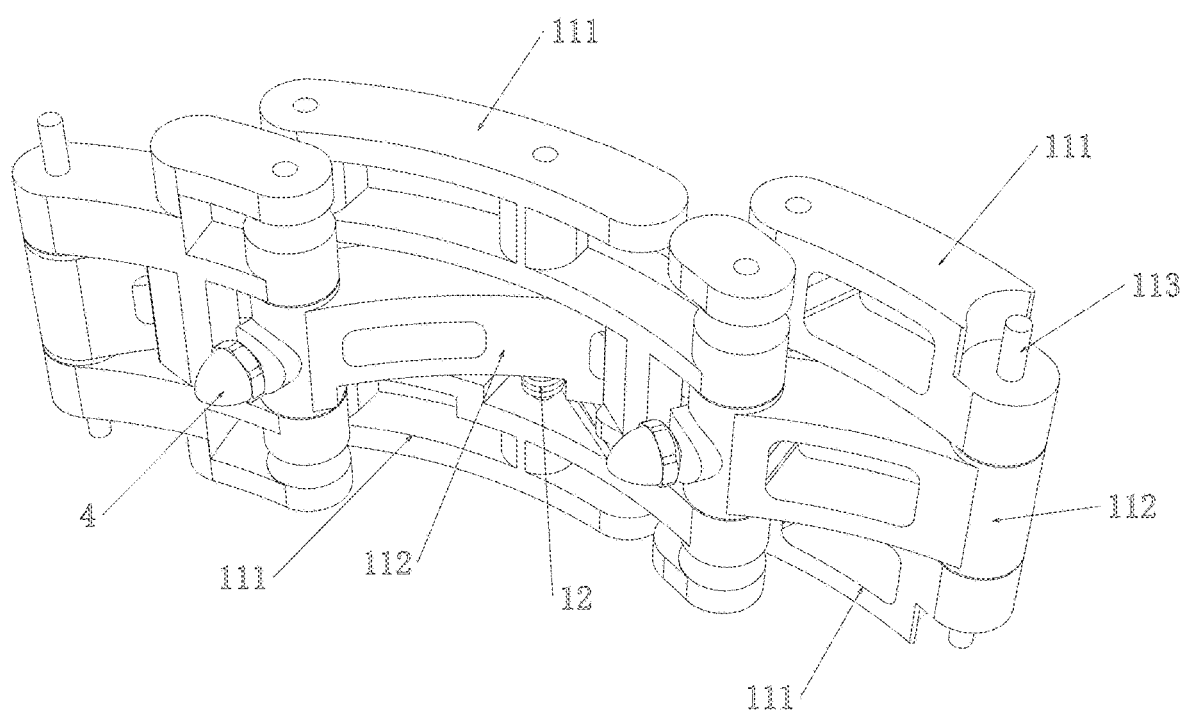
FIG. 11 is a structural perspective schematic diagram of a short scissor unit and a long scissor unit being connected together according to an embodiment of the present application.
Figure 12:
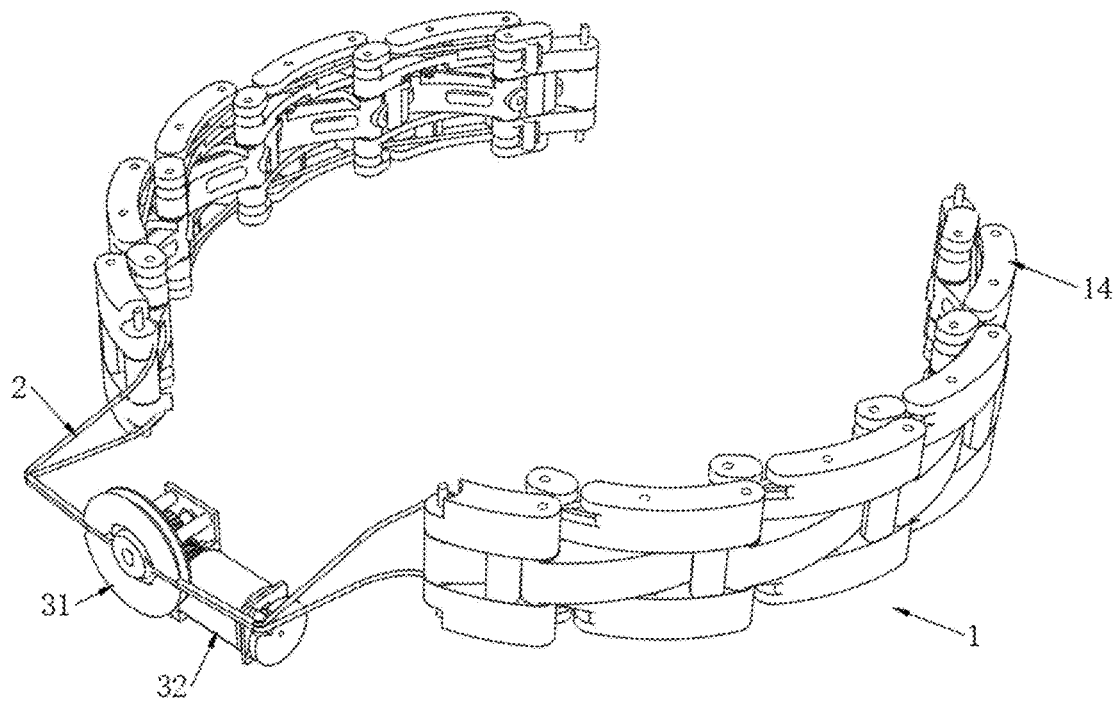
FIG. 12 is a structural schematic diagram of a reel and an electric motor being connected according to an embodiment of the present application.
Figure 13:
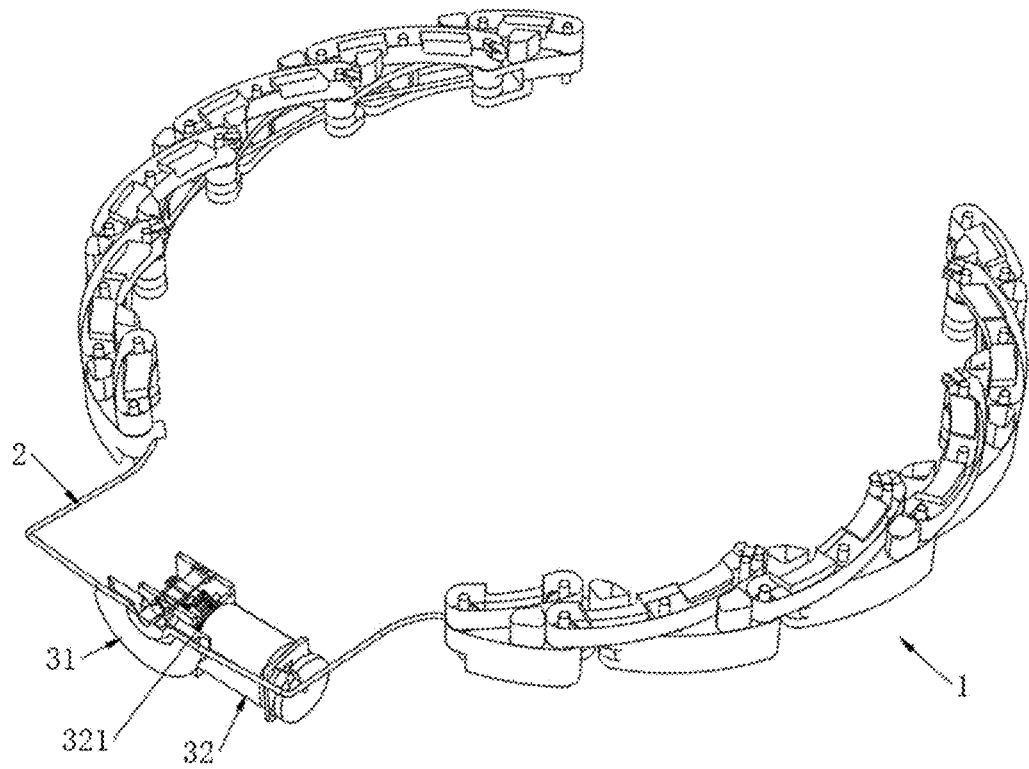
FIG. 13 is a schematic diagram of an internal structure of a reel and an electric motor being connected according to an embodiment of the present application.
Figure 14:
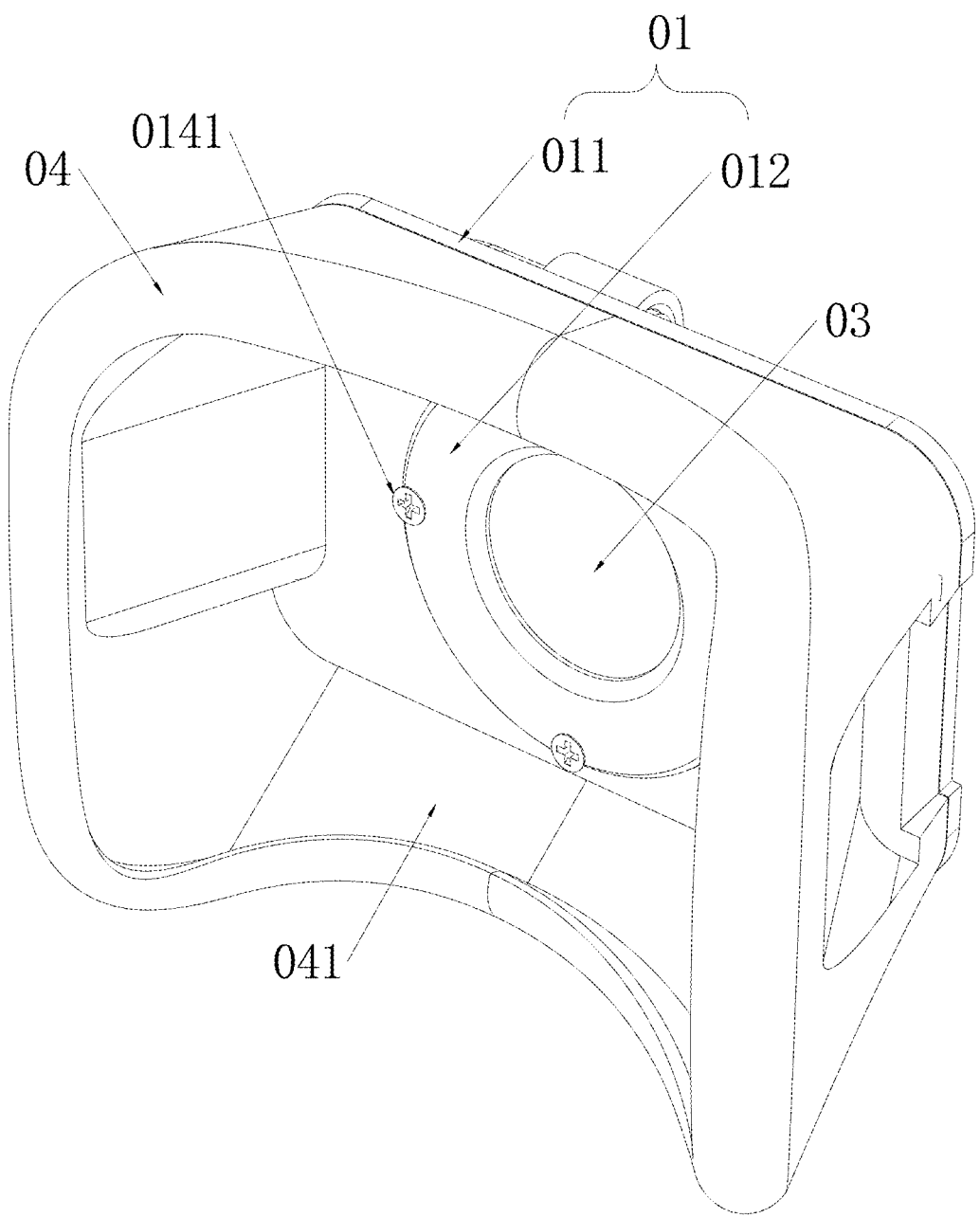
FIG. 14 is a structural perspective schematic diagram of an environmental audio filtering system according to an embodiment of the present application from a first perspective.

Referring to FIG. 8, in an embodiment, the elastic return member 12 is a torsion spring. The torsion spring is mounted on the first connecting shaft 113, and a first elastic arm of the torsion spring abuts on the first rod 111 and a second elastic arm of the torsion spring abuts on the second rod 112. Thus, during contraction, the first and second elastic arms are compressed to compress the torsion spring, ensuring that the torsion spring can accumulate potential energy so that when the traction rope 2 is released, the radial contraction module 1 can reset from the contraction position to the expansion position.

For ease of assembly, referring to FIGS. 1 to 5, in an embodiment, the radial contraction module 1 further includes:
- a head connector 13, the head connector 13 being located between the driving module 3 and the plurality of scissor units 11, and the head connector 13 connecting the driving module 3 to the scissor units 11 so that the scissor units 11 and the driving module 3 are connected together, where it can be understood that the head connector 13 and the driving module 3 are in fixed connection, and the head connector 13 and the scissor units 11 are articulated; and
- a tail connector 14, the tail connector 14 being located between the plurality of scissor units 11 and the adjusting module 5, the tail connector 14 connecting the scissor units 11 to the adjusting module 5 so that the scissor units 11 and the adjusting module 5 are connected together, where it can be understood that the tail connector 14 and the adjusting module 5 are in fixed connection and that the tail connector 14 and the scissor units 11 are articulated.

Referring to FIGS. 1 to 5 and FIGS. 12 and 13, in an embodiment, the first end of the traction rope 2 threads the scissor units 11 successively, and the first end of the traction rope 2 is connected to the scissor units 11 that are away from the driving module 3, so as to tighten or loosen the scissor units 11.

In an embodiment, the driving module 3 includes:
an electric motor 32; and
a reel 31, the reel 31 being connected to an output shaft 321 of the electric motor 32, the reel 31 being connected to the second end of the traction rope 2, the reel 31 winding the traction rope 2 along with forward rotation of the output shaft 321 of the electric motor 32, and the reel 31 releasing the traction rope 2 along with reverse rotation of the output shaft 321 of the electric motor 32. That is, by driving the electric motor 32, the output shaft 321 of the electric motor 32 rotates to bring the reel 31 in rotation, so that the traction rope 2 is wound onto the reel 31 or so that the traction rope 2 can be released from the reel 31. The reel 31 can play a role in positioning and guiding, which ensures smooth winding or releasing of the traction rope 2.

In an embodiment, the reel 31 has a rope slot and the traction rope penetrates and is restricted within the rope slot.

In an embodiment, the specific winding method of the traction rope is as follows:

A connection method of the traction rope specifically includes: the traction rope runs through the entire wearable structure, and is divided into an upper piece and a lower piece; and the two pieces of traction rope may be independent from each other or divided from a single complete traction rope. The two pieces of independent traction rope are fixed respectively to the scissor units of the two radial contraction modules closest to the adjusting module. Whereas the single complete traction rope may be folded in half, is divided into an upper path and a lower path from the tail connector connected to one of the radial contraction modules, to pass through the scissor units of one of the radial contraction modules, the reel, the scissor units of the other radial contraction module sequentially, and is fixedly connected to the other tail connector connected to the other radial contraction module.

In other embodiments, the driving module 3 may include only the electric motor 32, the second end of the traction rope 2 is connected to the output shaft 321 of the electric motor 32, and the traction rope 2 is wound or released by means of the output shaft 321 of the electric motor 32.

In an embodiment, the adjusting module 5 includes:
an adjusting buckle 52; and
an adjusting band 51, where a first end of the adjusting band 51 passes through a through hole 6 in the tail connector 14 to be movably connected to the adjusting buckle 52, and a second end of the adjusting band 51 passes through a through hole 6 in the other tail connector 14 to be movably connected to the adjusting buckle 52, so that the portion of the adjusting band 51 between the two tail connectors 14 can be shortened or extended by operating the adjusting buckle 52 to contract or expand the collar 6, making the structure simple and practical and facilitating the operation.

In other embodiments, the adjusting module 5 may also be a tension adjustment structure applied to products such as backpack shoulder straps, and crossbody bag shoulder straps.

A preferred embodiment of the present application provides a bark deterrent including the radially contractible wearable structure described above.

The bark deterrent of the present application using the radially contractible wearable structure described above can also achieve a controllable skin contact function, and can effectively avoid constriction injury to the skin of a living organism. Besides, manual removal of the wearable structure can be omitted, thereby simplifying the operation and improving the ease of use.

At present, almost all types of bark deterrents on the market use microphones, or mics for short, to trigger a bark suppression function. Regardless of the quality of the mics, it is always unable to properly prevent false triggering due to environmental noises. Upgrading a circuit hardware and software to solve the problem of false triggering would result in an exponential increase in cost, making it difficult to implement. The present application proposes an environmental audio filtering system to solve the above problems.

Referring to FIGS. 14 to 17, there is shown an environmental audio filtering system of the present application, which includes:

- a mount 01, where the mount 01 has an acoustic inlet 0111, an acoustic cavity 0112, and an acoustic outlet 0113, the acoustic inlet 0111 and the acoustic outlet 0113 are disposed on opposite sides of the acoustic cavity 0112, and both the acoustic inlet 0111 and the acoustic outlet 0113 are in communication with the acoustic cavity 0112;
- a microphone 02, where the microphone 02 is disposed on the mount 01, a sound input end of the microphone 02 is in communication with the acoustic outlet 0113, and the microphone 02 is configured to collect amplified sound waves;
- a diaphragm 03, where the diaphragm 03 is disposed on the mount 01, and the diaphragm 03 covers the acoustic inlet 0111; and
- an acoustic concentrator 04, where the acoustic concentrator 04 is disposed on a side of the mount 01 having the acoustic inlet 0111, the acoustic concentrator 04 has a sound-gathering channel 041, the sound-gathering channel 041 runs through opposite ends of the acoustic concentrator 04, a sound input end of the sound-gathering channel 041 is configured to be connected to a vocal part of an animal, a sound output end of the sound-gathering channel 041 is located on a side close to the acoustic inlet 0111, the sound output end of the sound-gathering channel 041 is disposed around the diaphragm 03, the sound-gathering channel 041 is configured to concentrate sound waves, and the acoustic concentrator 04 is configured to shield environmental noises.

The animal may be a pet or other animal other than the pet.

The environmental audio filtering system of the present application includes the mount 01, the microphone 02, the diaphragm 03, and the acoustic concentrator 04. When in use, the acoustic concentrator 04 is attached to the vocal part of the animal, the acoustic concentrator 04 can be configured to concentrate sound waves, and the acoustic concentrator 04 can also be configured to shield environmental noises. The sound waves concentrated by the acoustic concentrator 04 are amplified and strengthened, causing the diaphragm 03 to vibrate. The vibration of the diaphragm 03 further amplifies the sound waves. The vibration picked by the diaphragm 03 is protected by the acoustic cavity 0112 to avoid acoustic loss. The sound waves output by the diaphragm 03 are converted into electronic analog signals by the microphone 02, thereby emitting sounds to stop the pet from barking. Since the acoustic concentrator 04 can physically shield environmental noises directionally, and since the sound waves are amplified multiple times by means of the acoustic concentrator 04 and the diaphragm 03, the sensitivity of the microphone 02 can be set below the conventional standard. With the combination of directional physical shielding of the acoustic concentrator 04 and the setting of low sensitivity of the microphone 02, the surrounding environmental noises can be shielded effectively. This enables the environmental audio filtering system to sensitively serve the target object in complex working environments while effectively preventing false triggering caused by interference from other sounds in the surrounding environment. The system has a simple and practical structure, is low in cost, does not need expensive electronic hardware or software algorithms, and can address industry pain points with an extremely low cost.

In some embodiments, the environmental audio filtering system further includes:

- an acoustic tube 05, where the acoustic tube 05 is disposed on a side of the mount 01 having the acoustic outlet 0113, a sound input end of the acoustic tube 05 is in communication with the acoustic outlet 0113, a sound output end of the acoustic tube 05 is in communication with a sound input end of the microphone 02, and the acoustic tube 05 is configured to amplify sound waves output from the acoustic cavity 0112. With the acoustic tube 05, the sound waves outputted by the diaphragm 03 are amplified by multiple reflections of an inner cavity wall of the acoustic tube 05. As the sound waves are further amplified, the sensitivity of the microphone 02 can be further reduced, the surrounding environmental noises can be shielded effectively, and the performance to prevent false triggering can be further improved.

Figure 15:
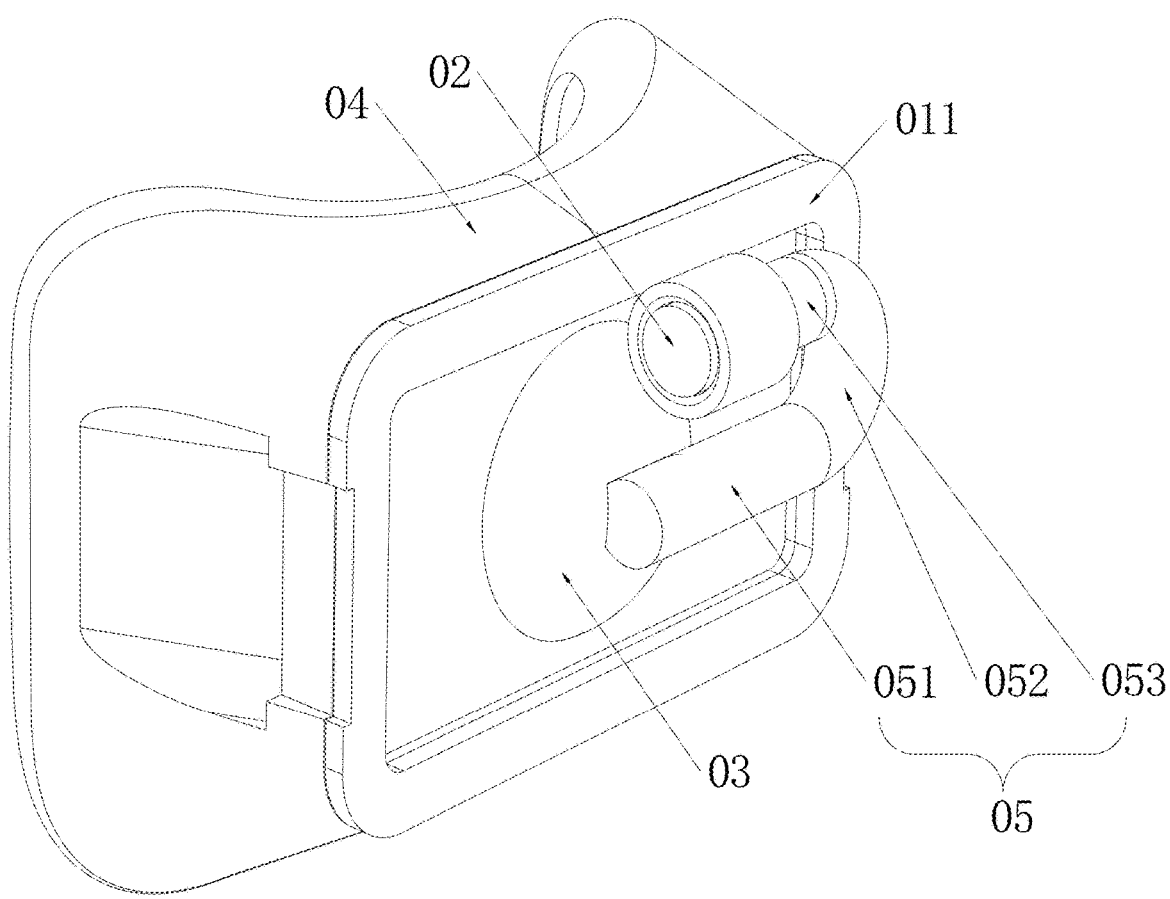
FIG. 15 is a structural perspective schematic diagram of an environmental audio filtering system according to an embodiment of the present application from a second perspective.
Figure 17:
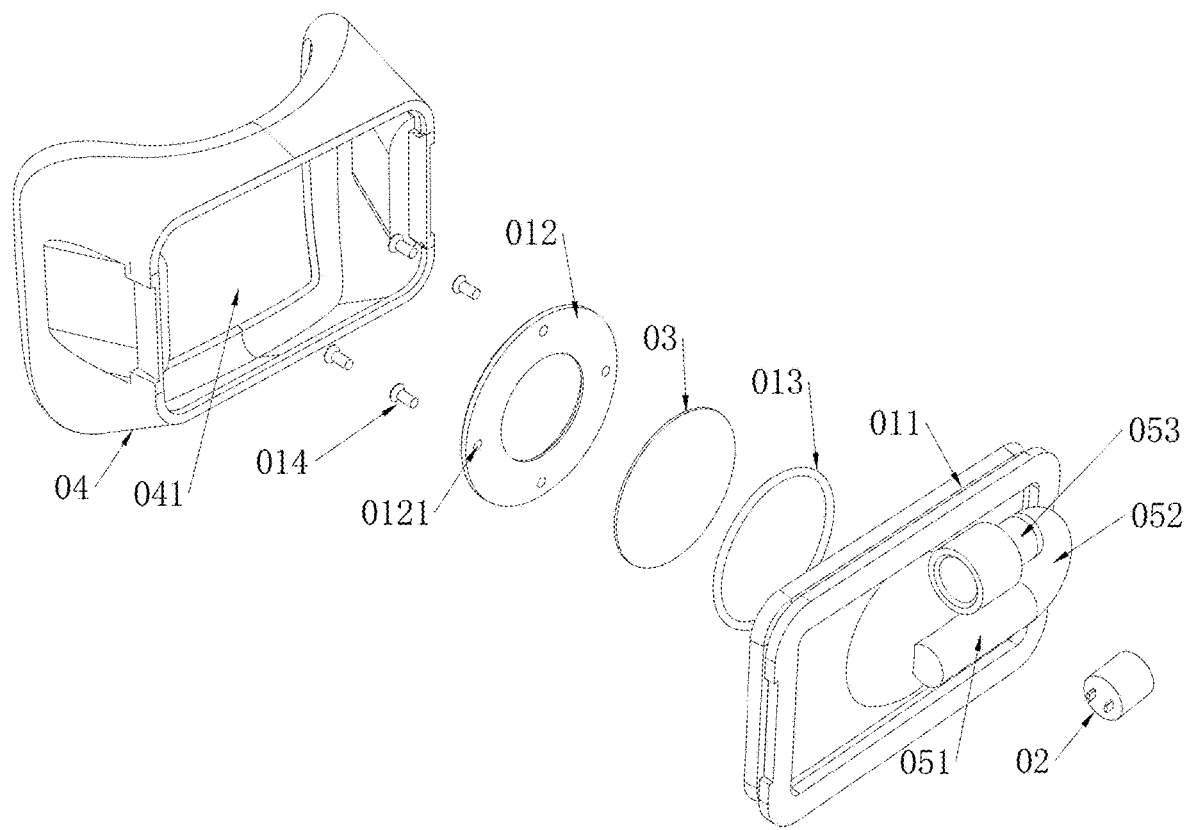
FIG. 17 is an exploded view of an environmental audio filtering system according to an embodiment of the present application from a second perspective.

Referring to FIGS. 15 and 17, in some embodiments, the acoustic tube 05 is provided with a first horizontal segment 051, a bent segment 052, and a second horizontal segment 053. The sound input end of the acoustic tube 05 is disposed at a first end of the first horizontal segment 051, the first horizontal segment 051 is parallel to the mount 01, a first end of the bent segment 052 is in communication with a second end of the first horizontal segment 051, the second horizontal segment 053 is disposed parallel to the first horizontal segment 051, a first end of the second horizontal segment 053 is in communication with a second end of the bent segment 052, and the sound output end of the acoustic tube 05 is disposed at a second end of the second horizontal segment 053. The acoustic tube 05, composed of the first horizontal segment 051, the bent segment 052 and the second horizontal segment 053, is of a special-shaped structure, so that an inner cavity of the acoustic tube 05 is also special-shaped, which is conducive to increasing the number of reflections of sound waves on the inner cavity wall of the acoustic tube 05, thereby gradually amplifying the sound waves, further reducing the sensitivity of the microphone 02, effectively shielding the surrounding environmental noises, and further improving the performance to prevent false triggering.

In some embodiments, the second horizontal segment 053 is located above or below the first horizontal segment 051, making the acoustic tube 05 U-shaped. The U-shaped acoustic tube 05 has a more compact structure, and occupies less space, which facilitates the miniaturization of the environmental audio filtering system and facilitates installation.

In other embodiments, the acoustic tube 05 may have a structure in the shape of a paper clip, or it may have a structure in other regular shapes or irregular shapes.

In some embodiments, the microphone 02 is inserted into the sound output end of the acoustic tube 05. By inserting the microphone 02 into the sound output end of the acoustic tube 05, the microphone 02 can be mounted on the acoustic tube 05. The structure is simple and practical, has high connection reliability, and is easy to install and operate.

In some embodiments, in order to enhance the reliability of connection between the microphone 02 and the sound output end of the acoustic tube 05, an adhesive is provided between the microphone 02 and the sound output end of the acoustic tube 05. The microphone 02 and the sound output end of the acoustic tube 05 are fixed together by means of the adhesive.

In some embodiments, in order to enhance the reliability of connection between the microphone 02 and the sound output end of the acoustic tube 05, a snap-fit structure is provided between the microphone 02 and the sound output end of the acoustic tube 05. The microphone 02 and the sound output end of the acoustic tube 05 are fixed together by means of the snap-fit structure.

In some embodiments, in order to enhance the reliability of connection between the microphone 02 and the sound output end of the acoustic tube 05, a fastening structure such as a screw or bolt is provided between the microphone 02 and the sound output end of the acoustic tube 05. The microphone 02 and the sound output end of the acoustic tube 05 are fixed together by means of the fastening structure such as the screw or bolt.

Referring to FIGS. 14 to 17, in some embodiments, the mount 01 includes:
- a base 011, the base 011 having an acoustic inlet 0111, an acoustic cavity 0112, and an acoustic outlet 0113; and
- a pressure ring 012, the pressure ring 012 being disposed on a side of the base 011 that has the acoustic inlet 0111, and the pressure ring 012 covering an outer edge of the diaphragm 03 to fix the diaphragm 03 to the base 011. Thus, the diaphragm 03 is mounted between the base 011 and the pressure ring 012, so that the diaphragm 03 can be mounted on the mount 01. The structure is simple and practical, low in cost, easy to install, and simple to operate.

Figure 16:
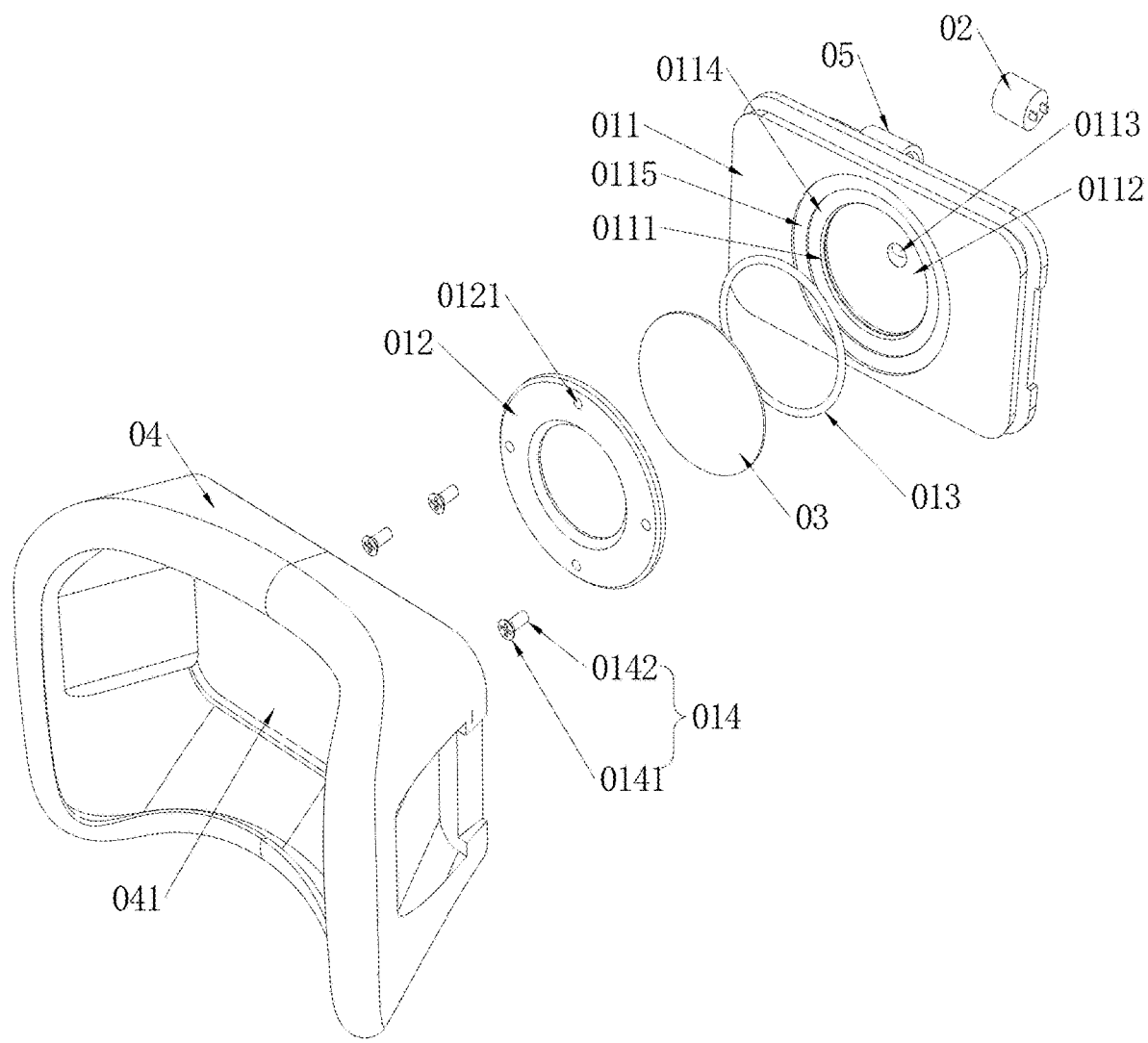
FIG. 16 is an exploded view of an environmental audio filtering system according to an embodiment of the present application from a first perspective.

Referring to FIG. 16, in some embodiments, the base 011 also has a first positioning groove 0114. The first positioning groove 0114 is disposed around the acoustic inlet 0111. The first positioning groove 0114 cooperates with the diaphragm 03 to realize mounting and positioning of the diaphragm 03, so that the diaphragm 03 is quickly mounted in the correct position to facilitate installation.

Referring to FIG. 16, in some embodiments, the base 011 also has a second positioning groove 0115. The second positioning groove 0115 is disposed around the first positioning groove 0114. The second positioning groove 0115 cooperates with the pressure ring 012 to realize mounting and positioning of the pressure ring 012, so that the pressure ring 012 is quickly mounted in the correct position to facilitate installation.

Referring to FIGS. 16 and 17, in some embodiments, the mount 01 further includes a washer 013, and the washer 013 is sandwiched between the outer edge of the diaphragm 03 and the base 011, so that opposite sides of the washer 013 are closely attached to the diaphragm 03 and the base 011 without gaps, thereby avoiding the loss of sound waves.

In some embodiments, the base 011 also has a plurality of threaded holes (not shown in the figures) arranged at intervals around the acoustic inlet 0111.

The pressure ring 012 also has a plurality of connecting holes 0121, the plurality of connecting holes 0121 are arranged at intervals around a central hole of the pressure ring 012, and the connecting holes 0121 are in communication with the threaded holes one by one, respectively.

The mount 01 further includes a plurality of fasteners 014. Each of the fasteners 014 is provided with a limiting portion 0141 and a connecting portion 0142, the limiting portion 0141 abuts on a side of the pressure ring 012 facing away from the base 011, and the connecting portion 0142 sequentially passes through the connecting hole 0121 and the threaded hole that are in communication with each other, to be connected to the threaded hole. Thus, the base 011 and the pressure ring 012 are reliably fixed together by means of the fasteners 014, which can greatly improve the reliability of connection of the two while enabling the detachment of the base 011 and the pressure ring 012, thus facilitating repair and maintenance.

In some embodiments, the fasteners 014 are any one of screws, bolts, etc.

In other embodiments, the pressure ring 012 and the base 011 may also be connected together by snap-fit connection, magnetic connection, and bolting.

The present application provides a bark deterrent, including the environmental audio filtering system described above.

The bark deterrent of the present application using the environmental audio filtering system described above can sensitively serve a unique object in a complex working environment and can also effectively eliminate false triggering caused by interference from other sounds in the surrounding environment. The bark deterrent has a simple and practical structure, is low in cost, does not need expensive electronic hardware or software algorithms, and can address industry's pain points with an extremely low cost.

In the description of this specification, descriptions with reference to the terms such as "an embodiment", "some embodiments", "example", "specific example", or "some examples" mean that specific features, structures, materials, or characteristics described with reference to the embodiment or example are included in at least one embodiment or example of the present application. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are merely used for the purpose of illustration, and cannot be construed as indicating or implying relative importance or implicitly indicating the number of technical features indicated. Thus, the features defined with "first" and "second" may explicitly or implicitly include at least one of the features. In the description of the present application, the meaning of "a plurality of" is two or more, unless explicitly and specifically defined otherwise.

The above description is merely specific embodiments of the present application, but is not intended to limit the scope of protection of the present application. Any variation or replacement readily figured out by a person skilled in the art within the technical scope disclosed in the present application shall fall within the scope of protection of the present application. Therefore, the scope of protection of the present application shall be subject to the scope of protection of the claims.

The invention claimed is:

1. A radially contractible wearable structure, comprising radial contraction modules, a traction rope, and a driving module;
   wherein the radial contraction modules and the driving module are connected end to end to form a collar for a living organism to pass through, one side of each of the radial contraction modules close to the collar is configured to be connected to electric shock contacts, the radial contraction modules each have a contraction position that contracts in a direction close to a centerline of the collar to bring the electric shock contacts into contact with the living organism, and the radial contraction modules each also have an expansion position that expands outward in a direction away from the centerline of the collar to separate the electric shock contacts from the living organism;

a first end of the traction rope is connected to the radial contraction module, and a second end of the traction rope is connected to the driving module; and the driving module is configured to wind the traction rope to shorten a portion of the traction rope outside the driving module to drive the radial contraction module to switch from the expansion position to the contraction position, and the driving module is also configured to release the traction rope to extend the portion of the traction rope outside the driving module to drive the radial contraction module to switch from the contraction position to the expansion position.

2. The radially contractible wearable structure according to claim 1, wherein two radial contraction modules are provided; and the radially contractible wearable structure further comprises:

an adjusting module, wherein the adjusting module, one of the radial contraction modules, the driving module, and the other of the radial contraction modules are connected end to end in sequence to form the collar, and the adjusting module is configured to adjust the size of the collar.

3. The radially contractible wearable structure according to claim 2, wherein the radial contraction module comprises a plurality of scissor units, each of the scissor units comprises a first rod and a second rod, the first rod and the second rod are articulated and capable of crossing each other, and the plurality of scissor units are articulated end to end in sequence around the centerline of the collar;

among the plurality of scissor units, the scissor unit at a head end is articulated to a head end of the adjusting module, and the scissor unit at a tail end is articulated to the driving module; and the electric shock contacts are disposed on the scissor units.

4. The radially contractible wearable structure according to claim 3, wherein two first rods and one second rod are comprised in the same scissor unit, and one of the first rods, the second rod and the other first rod are arranged in sequence in a height direction of the scissor unit;

in two adjacent scissor units, a tail end of the second rod of a previous scissor unit is disposed between head ends of the two first rods in a latter scissor unit, and the tail end of the second rod of the previous scissor unit is articulated to the head ends of the two first rods of the latter scissor unit; and in two adjacent scissor units, a head end of the second rod in the latter scissor unit is disposed between tail ends of the two first rods in the previous scissor unit, and the head end of the second rod in the latter scissor unit is articulated to the tail ends of the two first rods in the previous scissor unit.

5. The radially contractible wearable structure according to claim 4, wherein among the plurality of scissor units of the same radial contraction module, the two scissor units at the head and tail ends each have a length that is smaller than a length of any of the remaining scissor units.

6. The radially contractible wearable structure according to claim 5, wherein among the plurality of scissor units, each of the long scissor units is further provided with an elastic return member for providing a driving force to the first rods and the second rod to drive the radial contraction module to switch from the contraction position to the expansion position when the portion of the traction rope outside the driving module is extended.

7. The radially contractible wearable structure according to claim 3, wherein the radial contraction module further comprises:

a head connector between the driving module and the plurality of scissor units and connecting the driving module to the scissor units; and a tail connector between the plurality of scissor units and the adjusting module and connecting the scissor units to the adjusting module.

8. The radially contractible wearable structure according to claim 3, wherein the first end of the traction rope threads the scissor units successively, and the first end of the traction rope is connected to the scissor unit that is away from the driving module.

9. The radially contractible wearable structure according to claim 1, wherein the driving module comprises:

an electric motor; and a reel, the reel being connected to an output shaft of the electric motor and being connected to the second end of the traction rope, the reel winding the traction rope along with forward rotation of the output shaft of the electric motor, and the reel releasing the traction rope along with reverse rotation of the output shaft of the electric motor.

* * * * *